United States Patent
Nomoto

(12) 
(10) Patent No.: US 6,657,930 B1
(45) Date of Patent: Dec. 2, 2003

(54) TRACKING CONTROL CIRCUIT FOR TRACKING A WOBBLING TRACK FORMED ON AN OPTICAL RECORDING MEDIUM

(75) Inventor: Takayuki Nomoto, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 286 days.

(21) Appl. No.: 09/702,741

(22) Filed: Nov. 1, 2000

(30) Foreign Application Priority Data

Nov. 2, 1999 (JP) .......................................... 11-312025

(51) Int. Cl.$^7$ ................................................ G11B 7/00
(52) U.S. Cl. ................ 369/44.28; 369/44.26; 369/44.42
(58) Field of Search ........................ 369/44.13, 275.3, 369/44.41, 44.42, 44.26, 44.28

(56) References Cited

U.S. PATENT DOCUMENTS

| | | | | | |
|---|---|---|---|---|---|
| 4,544,838 A | * | 10/1985 | Musha et al. | ............ | 369/44.41 |
| 5,875,157 A | * | 2/1999 | Sasaki et al. | ............ | 369/44.29 |
| 6,058,093 A | * | 5/2000 | Kato et al. | ............ | 369/44.13 |

\* cited by examiner

*Primary Examiner*—Nabil Hindi
(74) *Attorney, Agent, or Firm*—Sughrue Mion, PLLC

(57) ABSTRACT

A tracking control circuit includes a light receiving element divided in at least four sections. Of these, a group of divided light receiving sections located on a diagonal line obtains a first differential signal. A group of divided light receiving sections located on another diagonal line obtains a second differential signal. In accordance with the phase difference between the first and second differential signals, a tracking error signal is generated to make tracking control on a wobbled information recording track.

4 Claims, 6 Drawing Sheets

TRACKING CONTROL CIRCUIT FOR TRACKING A WOBBLING TRACK FORMED ON AN OPTICAL RECORDING MEDIUM

BACKGROUND OF THE INVENTION

1. Field of the Invention

The invention relates to a tracking control circuit for making a light beam follow an information recording track on wobbling-track-included optical recording media, typified by CD-R, DVD-R, and the like.

2. Description of the Related Art

Conventionally, in optical information recording devices for recording information on an optical recording medium such as CD-R, it is advantageous, in terms of securing output power required of a recording light beam for information recording, for the tracking control on a recording track to adopt single beam tracking in which the light beam emitted from a pickup's semiconductor laser is used with high efficiency. The single beam tracking commonly uses a push-pull method.

In single beam tracking control using a push-pull method, an information recording track formed on an optical disk is irradiated with the light beam output from the pickup. The reflected beam therefrom is received by a light receiving element which is divided in two by a dividing line optically parallel to a tangent direction of the information recording track. The difference between light reception outputs from the individual divided light receiving sections on the light receiving element is obtained to generate a tracking error signal. Then, in accordance with this tracking error signal, an objective lens is appropriately driven in the radial direction of the disk, i.e. in the direction orthogonal to the tangent direction of the information recording track, so that the light beam emitted from the semiconductor laser is controlled to stay on the information recording track.

The single beam tracking control using the push-pull method described above, however, involves a problem that a displacement between the optical axis of the objective lens and the optical axis of the light receiving element, produced by the exclusive driving of the objective lens in the disk radial direction can cause a tracking error even when the light beam is incident on the track center. More specifically, the above-mentioned displacement between the optical axes produces a direct current component (hereinafter, referred to as lens offset) in the tracking error signal, and hence the tracking control is made with a position biased by the amount equivalent to this lens offset as the target position (track center position).

SUMMARY OF THE INVENTION

The present invention has been achieved in view of the foregoing, and an object thereof is to provide a tracking control circuit which enables single beam tracking control independent of lens offsets.

The invention in a first aspect provides a tracking control circuit for making a light beam follow a wobbling track formed on an optical recording medium, comprising driving means for driving the light beam across the wobbling track under a tracking error signal generated in accordance with a reflected beam from the optical recording medium, of the light beam incident on the optical recording medium. The tracking control circuit further comprises: light receiving means for receiving the reflected beam, the light receiving means being divided into at least four sections by a first dividing line optically parallel to a tangent direction of the wobbling track and a second dividing line optically parallel to a direction orthogonal to the tangent direction; first computing means for obtaining a difference between the output signals from a first divided light receiving section and a third divided light receiving section located on a first diagonal line on the light receiving means, to output a first differential signal; second computing means for obtaining a difference between the output signals from a second divided light receiving section and a fourth divided light receiving section located on a second diagonal line on the light receiving means, to output a second differential signal; and phase comparing means for comparing the first differential signal and the second differential signal in phase to output a phase difference signal. Here, the phase difference signal is used as the tracking error signal.

According to the first aspect of the invention, the phase comparing means can compare the first differential signal and the second differential signal in phase to detect a phase difference which is proportional to the amount of off-track of the wobbling track. Therefore, driving an objective lens in accordance with a tracking error signal generated from the phase difference allows the tracking control to make a light beam follow a wobbling track with accuracy. Moreover, diffraction components caused by the wobbling are concentrated on the peripheral regions of the reflected beam received by the light receiving element. Accordingly, even if a lens offset occurs, no direct-current offset component will appear in the tracking error signal unless the displacement shifts the regions on which the wobbling-originated diffraction components are concentrated to over divided light receiving sections other than those for the regions to be received originally. This means no displacement of the target position.

In a second aspect, the invention provides a tracking control circuit for making a light beam follow a wobbling track formed on an optical recording medium, comprising driving means for driving the light beam across the wobbling track under a tracking error signal generated in accordance with a reflected beam from the optical recording medium, of the light beam incident on the optical recording medium. The tracking control circuit further comprises: light receiving means for receiving the reflected beam, the light receiving means being divided into at least four sections by a first dividing line optically parallel to a tangent direction of the wobbling track and a second dividing line optically parallel to a direction orthogonal to the tangent direction; first computing means for obtaining a difference between the output signals from a first divided light receiving section and a third divided light receiving section located on a first diagonal line on the light receiving means, to output a first differential signal; second computing means for obtaining a difference between the output signals from a second divided light receiving section and a fourth divided light receiving section located on a second diagonal line on the light receiving means, to output a second differential signal; phase comparing means for comparing the first differential signal and the second differential signal in phase to output a phase difference signal; third computing means for obtaining the sum of the output signals from the first divided light receiving section and the fourth divided light receiving section in the light receiving means to output a first sum signal; fourth computing means for obtaining the sum of the output signals from the second divided light receiving section and the third divided light receiving section in the light receiving means to output a second sum signal; fifth computing means for obtaining a difference between the first sum signal and the second sum signal to output a third differential signal; sixth computing means for obtaining a difference between the third differential signal and the phase difference signal to output a fourth differential signal; and seventh computing means for obtaining a difference between the third differential signal and the fourth differential signal to output a fifth differential signal. Here, the fifth differential signal is used as the tracking error signal.

According to the second aspect of the invention, the phase comparing means can compare the first differential signal and the second differential signal in phase to detect the amount of offset of the wobbling track. The amount of offset is subtracted from the third differential signal, or a push-pull error signal obtained by the fifth computing means, to generate the fourth differential signal. This fourth differential signal is subtracted from the third differential signal mentioned above to generate the fifth differential signal. Then, driving an objective lens with this fifth differential signal as the tracking error signal can remove a lens offset occurring in the push-pull error signal. This enables the tracking control of making a light beam follow a wobbling track with accuracy.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, preferred embodiments of the present invention will be described with reference to the accompanying drawings.

First Embodiment

Figure 1:
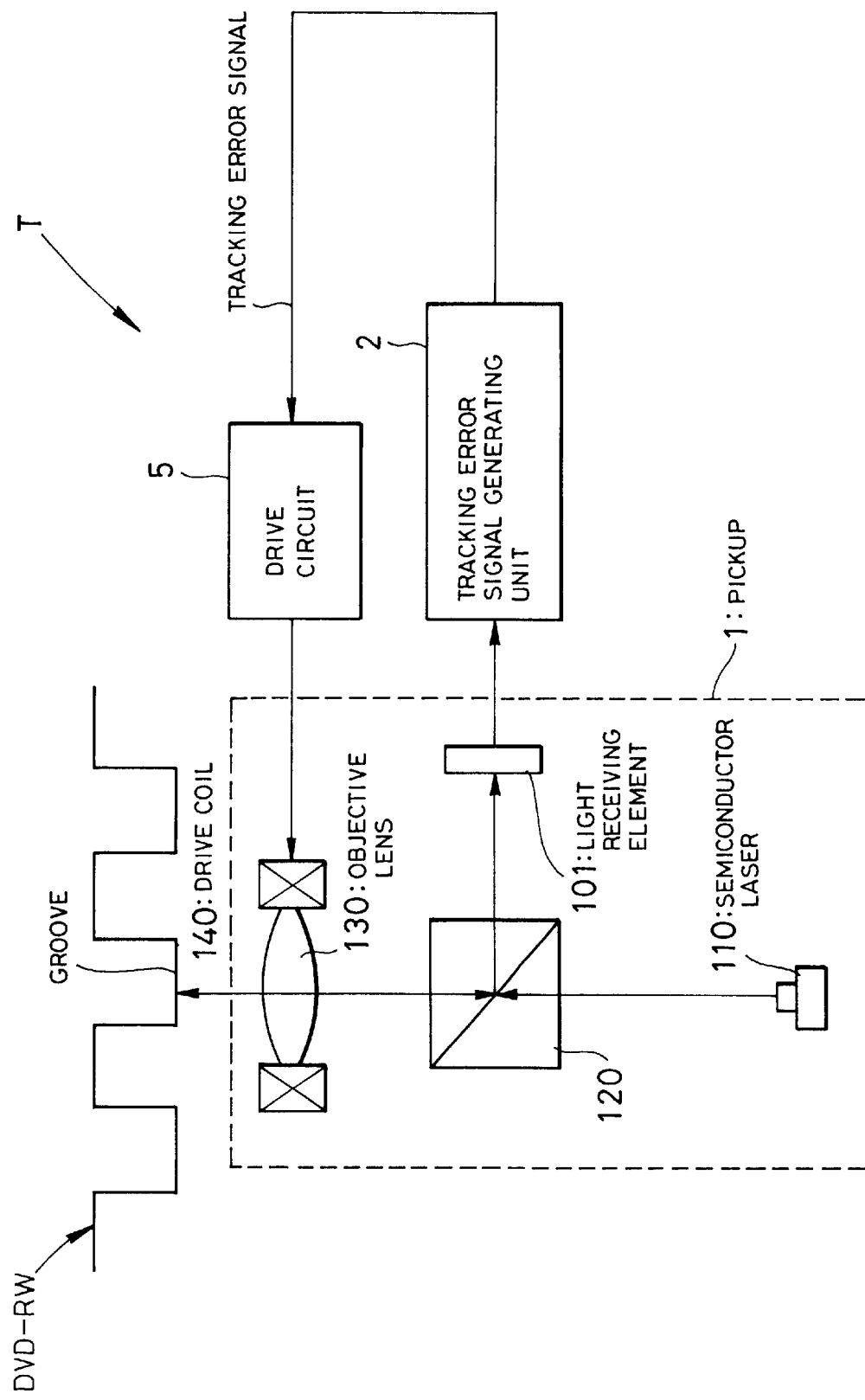
FIG. 1 is a schematic block diagram of a tracking control circuit showing a preferred embodiment of the present invention.

FIG. 1 is a schematic block diagram of a tracking control circuit showing a preferred embodiment of the present invention. Incidentally, this embodiment deals with an example where an information-rewritable DVD-RW is used as the optical recording medium including a wobbling information recording track.

Figure 4:
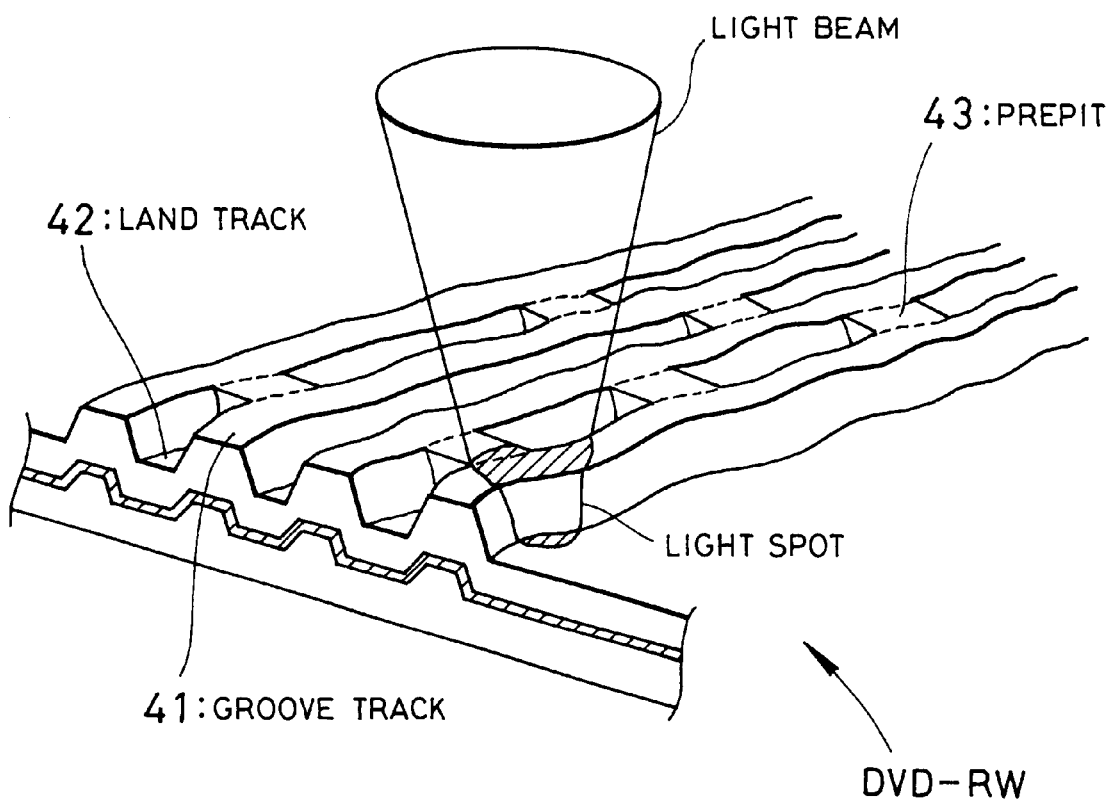
FIG. 4 is a diagram showing the track structure of a DVD-RW.

The DVD-RW, as shown in FIG. 4, has a wobbling track (groove track) 41 formed therein. The wobbling track 41 is an information recording track, or pregroove, slightly wobbled in the radial directions of the disk along its entire length in accordance with a carrier of predetermined frequency (approximately 140 kHz).

Moreover, prepits (LPP) 43 for carrying address information on the disk are formed on a land track 42.

In FIG. 1, a tracking control circuit T comprises a pickup 1, a tracking error signal generating unit 2, and a drive circuit 5. The tracking error signal generating unit 2 consists of a subtractor 202 serving as first computing means, a subtractor 203 serving as second computing means, and a phase comparison circuit 204 to be described later.

The pickup 1 comprises a semiconductor laser 110, an objective lens 130, a prism 120, a light receiving element 101, and a drive coil 140. The semiconductor laser 110 is a light source for emitting a light beam. The objective lens 130 condenses the light beam emitted from the semiconductor laser onto the recording surface of a DVD-RW. The prism 120 achieves separation between the emitted light beam from the semiconductor laser 110 and reflected light beams from the DVD-RW. The light receiving element 101 receives the reflected light beams supplied through the prism 120. The drive coil 140 moves the objective lens 130 in the cross-track direction based on a drive signal supplied from the drive circuit 5.

Here, the objective lens 130, the drive coil 140, and the drive circuit 5 constitute driving means.

Now, referring to FIG. 2, description will be given of the tracking error signal generating unit 2.

Figure 2:
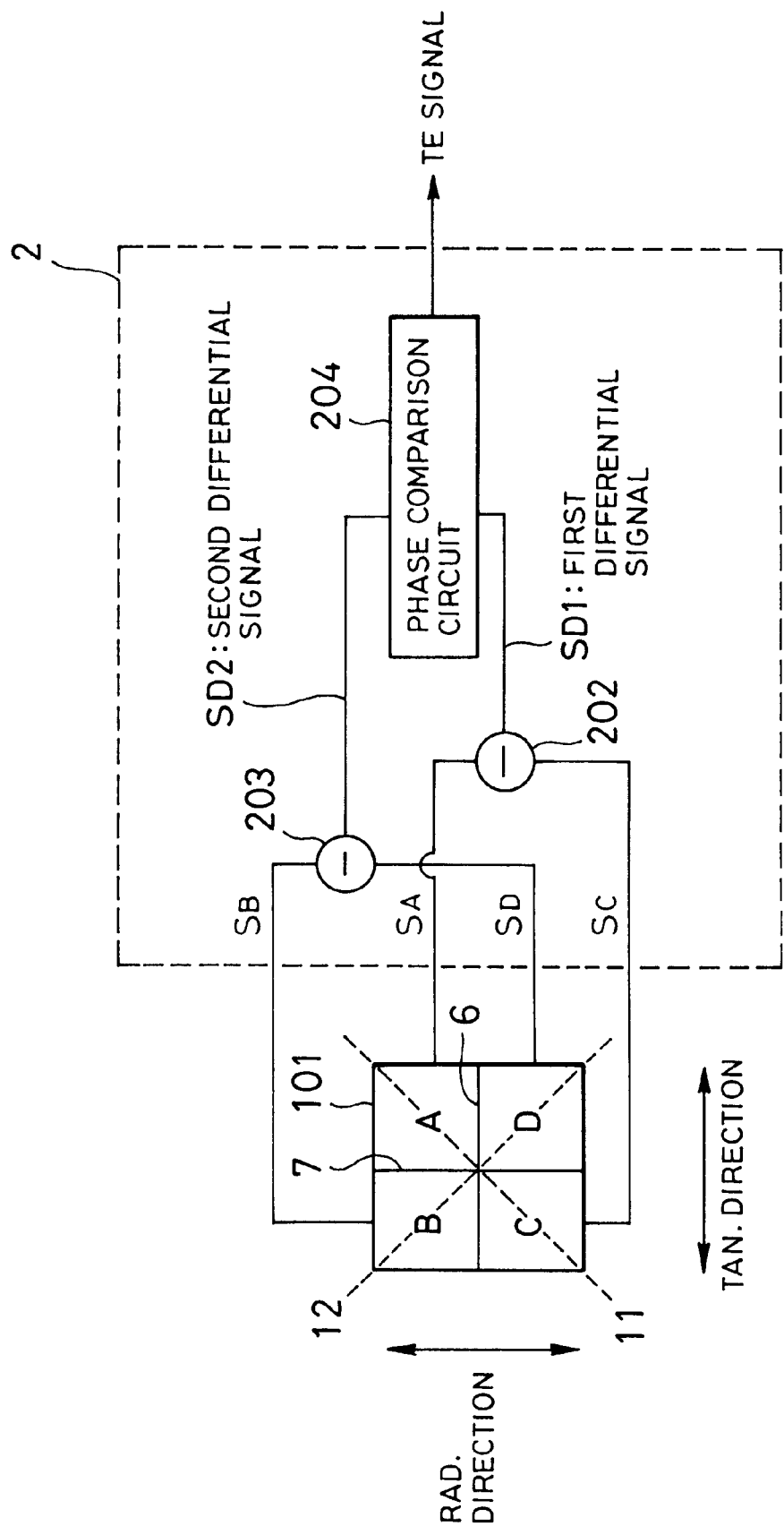
FIG. 2 is a detail view of a tracking error signal generating unit 2 shown in FIG. 1.

FIG. 2 is a detail view of the light receiving element 101 and the tracking error signal generating unit 2. As shown in FIG. 2, the light receiving element 101 is divided into at least four light receiving sections (hereinafter, these light receiving sections will be referred to as divided light receiving sections) A–D by a first dividing line 6 and a second dividing line 7. The first dividing line 6 is optically parallel to a tangent direction (TAN direction) of the groove track 41 on the DVD-RW. The second dividing line 7 is optically parallel to a direction crossing the tangent direction of the groove track 41 at right angles (RAD direction), i.e., orthogonal to the first dividing line 6.

The subtractor 202, or the first computing means, obtains a difference between the output signals from the first divided light receiving section "A" and the third divided light receiving section "C" located on a first diagonal line 11 on the light receiving element 101 ($S_A - S_C$), to output a first differential signal SD1. The subtractor 203, or the second computing means, obtains a difference between the output signals from the second divided light receiving section "B" and the fourth divided light receiving section "D" located on a second diagonal line 12 on the light receiving element 101 ($S_B - S_D$), to output a second differential signal SD2.

The phase comparison circuit 204 makes a phase comparison between the first differential signal SD1 and the second differential signal SD2, and outputs the resultant phase difference signal to the drive circuit 5 as a tracking error signal (TE signal). As will be described later, the phase difference between the first differential signal SD1 and the second differential signal SD2 is given by a function of the amount of off-track of the light beam with respect to the groove track (wobbling track). Therefore, based on such a phase difference signal, the drive coil 140 with the objective lens 130 can be driven in the disk radial direction to make the light beam follow the groove accurately in a state of on-track.

Hereinafter, description will be given of how the phase difference between the first differential signal SD1 and the second differential signal SD2 is a function of the amount of off-track of the light beam with respect to the groove track (wobbling track) in the DVD-RW.

Figure 3:
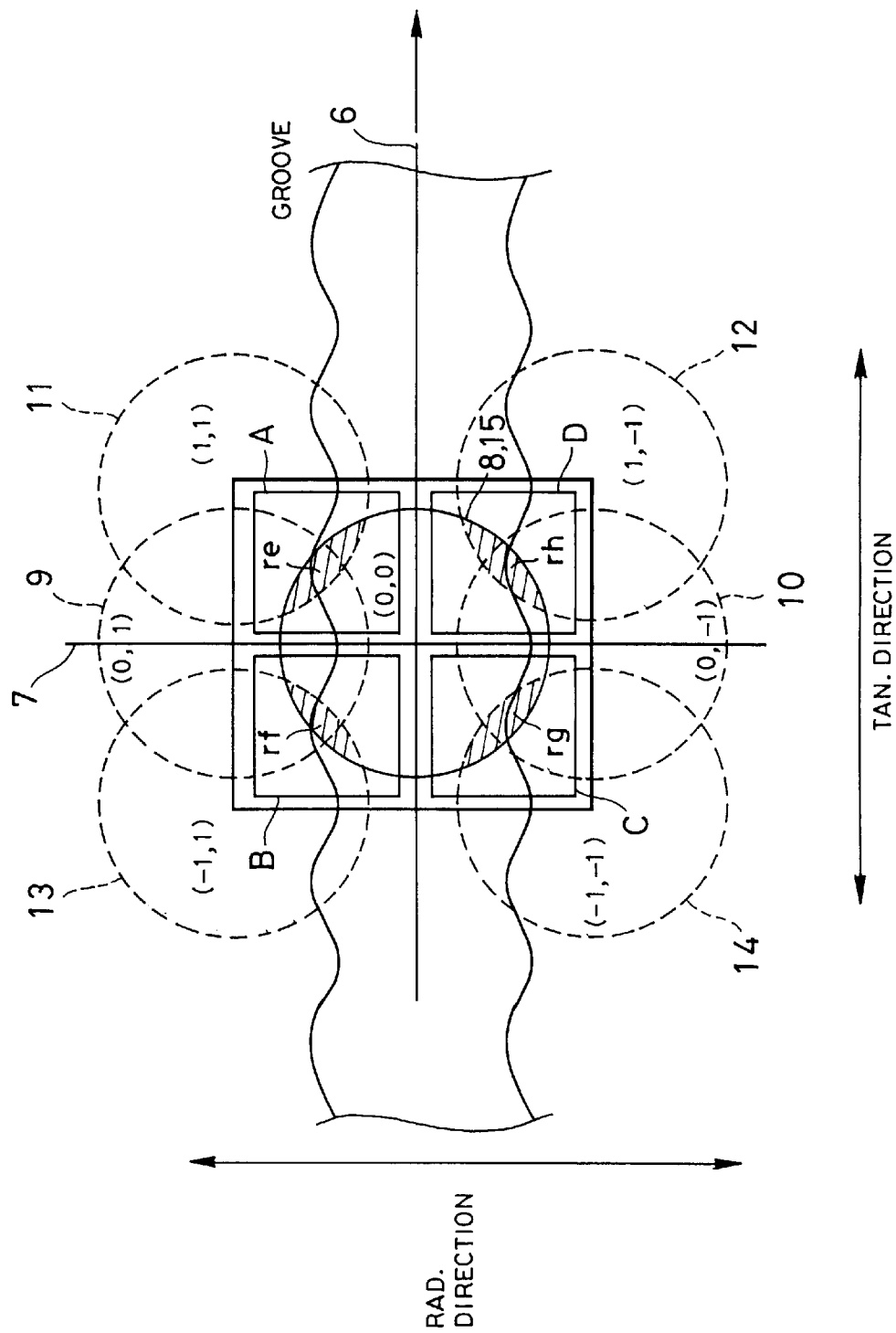
FIG. 3 is a diagram schematically showing reflected beams for the individual light receiving sections in the light receiving means to receive when an information-unrecorded groove (wobbling track) in a rotating DVD-RW is irradiated with a light beam at the center.

FIG. 3 is a diagram schematically showing diffraction light beams 8–14 which are major contributors to the quantity of reflected light among the DVD-RW reflected beams the divided light receiving sections A–D in the light receiving element 101 receive when an unrecorded wobbling track in the rotating DVD-RW is irradiated with a light beam on its center line.

Here, all the diffraction light beams are supposed to be restricted by an opening 15. The opening 15 is located at the same position and has the same dimensions as those of a (0, 0)-th diffraction light beam 8.

Figure 5:
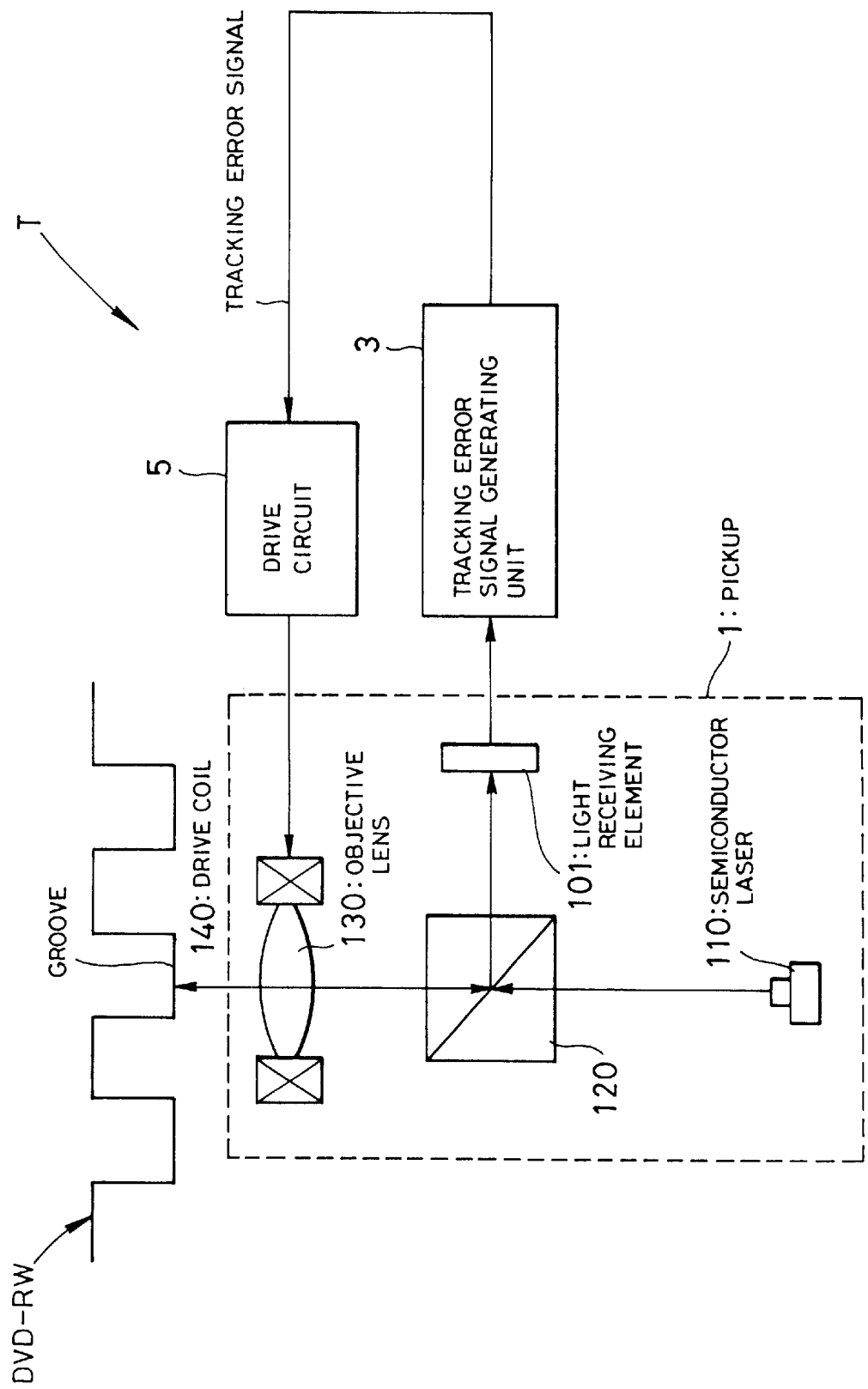
FIG. 5 is a schematic block diagram of a tracking control circuit showing a second preferred embodiment of the present invention.

The light beam incident on the wobbling track in the DVD-RW is diffracted by the wobbling portions of the wobbling track. As shown in FIG. 5, the result is that the light receiving element 101 receives six diffraction light beams around the 0, 0)-th diffraction light beam 8, restricted by the opening 15.

Here, the divided light receiving sections obtain reflected light signals including AC components (signal components produced by interference between diffraction light beams of difference orders m). The following shows eight possible AC components (ACra-ACrh) from eight interference regions:

ACra (AC component on each point in the interference region of a 0, 1)-th diffraction light beam 9 and a 1, 1)-th diffraction light beam 11, restricted by the opening 15);

ACrb (AC component on each point in the interference region of the (0, 1)-th diffraction light beam 9 and a (−1, 1)-th diffraction light beam 13, restricted by the opening 15);

ACrc (AC component on each point in the interference region of a (0, −1)-th diffraction light beam 10 and a (−1, −1)-th diffraction light beam 14, restricted by the opening 15);

ACrd (AC component on each point in the interference region of the (0, −1)-th diffraction light beam 10 and a (1, −1)-th diffraction light beam 12, restricted by the opening 15);

ACre (AC component on each point in the interference region of the 0, 0)-th diffraction light beam 8 and the (−1, −1)-th diffraction light beam 11, restricted by the opening 15);

ACrf (AC component on each point in the interference region of the 0, 0)-th diffraction light beam 8 and the (−1, −1)-th diffraction light beam 13, restricted by the opening 15);

ACrg (AC component on each point in the interference region of the 0, 0)-th diffraction light beam 8 and the (−1, −1)-th diffraction light beam 14, restricted by the opening 15); and ACrh (AC component on each point in the interference region of the 0, 0)-th diffraction light beam 8 and the (1, −1)-th diffraction light beam 12, restricted by the opening 15).

Assuming here that the incident beam is uniform in intensity distribution, the AC components on the individual points in the above-mentioned interference regions where diffraction light beams make interference are determined based on a scalar diffraction theory as follows:

$ACra=2A\cos(\omega t)$, $ACrb=-2A\cos(\omega t)$, $ACrc=2A\cos(\omega t)$, $ACrd=-2A\cos(\omega t)$, $ACre=2[(E\cos\phi+F\sin\phi)\cos(\omega t)+(F\cos\phi-E\sin\phi)\sin(\omega t)]$, $ACrf=2[-(E\cos\phi+F\sin\phi)\cos(\omega t)+(F\cos\phi-E\sin\phi)\sin(\omega t)]$, $ACrg=2[(E\cos\phi-F\sin\phi)\cos(\omega t)-(F\cos\phi+E\sin\phi)\sin(\omega t)]$, and $ACrh=2[-(E\cos\phi-F\sin\phi)\cos(\omega t)-(F\cos\phi+E\sin\phi)\sin(\omega t)]$, where $\phi=2\pi\cdot v/q$, v: the amount of off-track, g: groove width, q: track pitch, wo: the amount of wobble, $\omega$: wobbling frequency, $E=[F]\cdot(1-2\ g/q)$, $F=-(2/\pi)\cdot\sin(\pi\cdot g/q)\sin(2\pi\cdot wo/q)$, and $A=[F]\cdot(2/\pi)\cdot\sin(\pi\cdot g/q)\cos(2\pi\cdot wo/q)$.

Thus, among the eight AC components mentioned above, the four AC components ACre, ACrf, ACrg, and ACrh are functions of the amount of off-track v.

Accordingly, the light receiving element 101 receives reflected light that carries the amount of off-track v at the regions where the 0, 0)-th diffraction light beam and the (±1, ±1)-th diffraction light beams are interference, i.e., the four regions re, rf, rg, and rh shaded diagonally shown in FIG. 3.

As seen from FIG. 3, the four regions re, rf, rg, and rh are located to be axially symmetrical to each other about the first dividing line 6 and the second dividing line 7, and are identical to each other in area.

Given that the incident beam is uniform in intensity distribution, each of the above-mentioned four regions re, rf, rg, and rh on the light receiving element 101 receives reflected light containing an AC component given by the product of the AC component on each point in the region and the area of the region.

Consequently, the first differential signal obtained by the subtractor 202 serving as the first computing means, i.e., the difference $(S_A-S_C)$ between the output signals from the group of divided light receiving sections on the first diagonal line 11 ("A" and "C" shown in FIG. 3) is the reflected light's AC component in the region re minus the reflected light's AC component in the region rg, given by:

$$DAC=4YF\sin(\omega t+\phi), \qquad (1)$$

where

Y: the overlap between the (0, 0)-th diffraction light beam 8 and the (±1, 1)-th diffraction light beams 11, 14 (the total area of the shaded regions re and rg shown in FIG. 3).

Similarly, the second differential signal obtained by the subtractor 203 serving as the second computing means, i.e., the difference $(S_B-S_D)$ between the output signals from the group of divided light receiving sections on the second diagonal line 12 ("B" and "D" shown in FIG. 3) is the reflected light's AC component in the region rf minus the reflected light's AC component in the region rh, given by the equation (2) below:

$$DBD=4YF\sin(\omega t-\phi), \qquad (2)$$

where

Y: the overlap between the (0, 0)-th diffraction light beam 8 and the (±1, −1)-th diffraction light beams 12, 13 (the total area of the shaded regions rf and rh shown in FIG. 3).

Accordingly, a phase comparison between the above-described equations (1) and (2) determines a phase difference of 2φ, which is a function of off-track. That is, the diffraction components caused by the wobbling portions of the wobbling track are concentrated on the regions re, rf, rg, and rh mentioned above. In view of this, the present invention is configured so that the phase comparison circuit 204 obtains the phase difference between the first differential signal, or a difference signal between the divided light receiving sections located on the first diagonal line on the light receiving element 101, and the second differential signal, or a difference signal between the divided light receiving sections located on the second diagonal line.

As a result, the drive circuit 5 can generate a driving force proportional to the amount of off-track v in accordance with the above-mentioned phase difference 2φ obtained by the phase comparison circuit 204. Since the objective lens is moved along the disk radial direction by this driving force, it is possible to follow the wobbling track with accuracy. Here, the above-described regions (re, rf, rg, and rh) on which the diffraction components caused by the wobbling portions of the wobbling track are concentrated are located around the 0-th light beam 8. Therefore, even if the tracking control causes some displacement (lens offset) between the optical axes of the objective lens 130 and the light receiving element 101, no direct-current component (offset component) occurs in the tracking error signal unless the displacement shifts the above-mentioned regions (re, rf, rg, and rh) on which the diffraction components caused by the above-described wobbling portions are concentrated to over divided light receiving sections other than those for the regions to be received originally (in this example, re is to be originally received by the divided light receiving section A; rf by the divided light receiving section B; rg by the divided light receiving section C; and rh by the divided light receiving section D).

Second Embodiment

Now, a second preferred embodiment of the present invention will be described with reference to FIGS. 5 and 6.

FIG. 5 is a schematic block diagram of a tracking control circuit showing the second preferred embodiment of the present invention. FIG. 6 is a detailed block diagram of a tracking error signal generating unit 3 in FIG. 5. In FIGS. 5 and 6, blocks equivalent to those of the FIGS. 1 and 2 will be designated by like reference numerals, and description thereof will be omitted.

Figure 6:
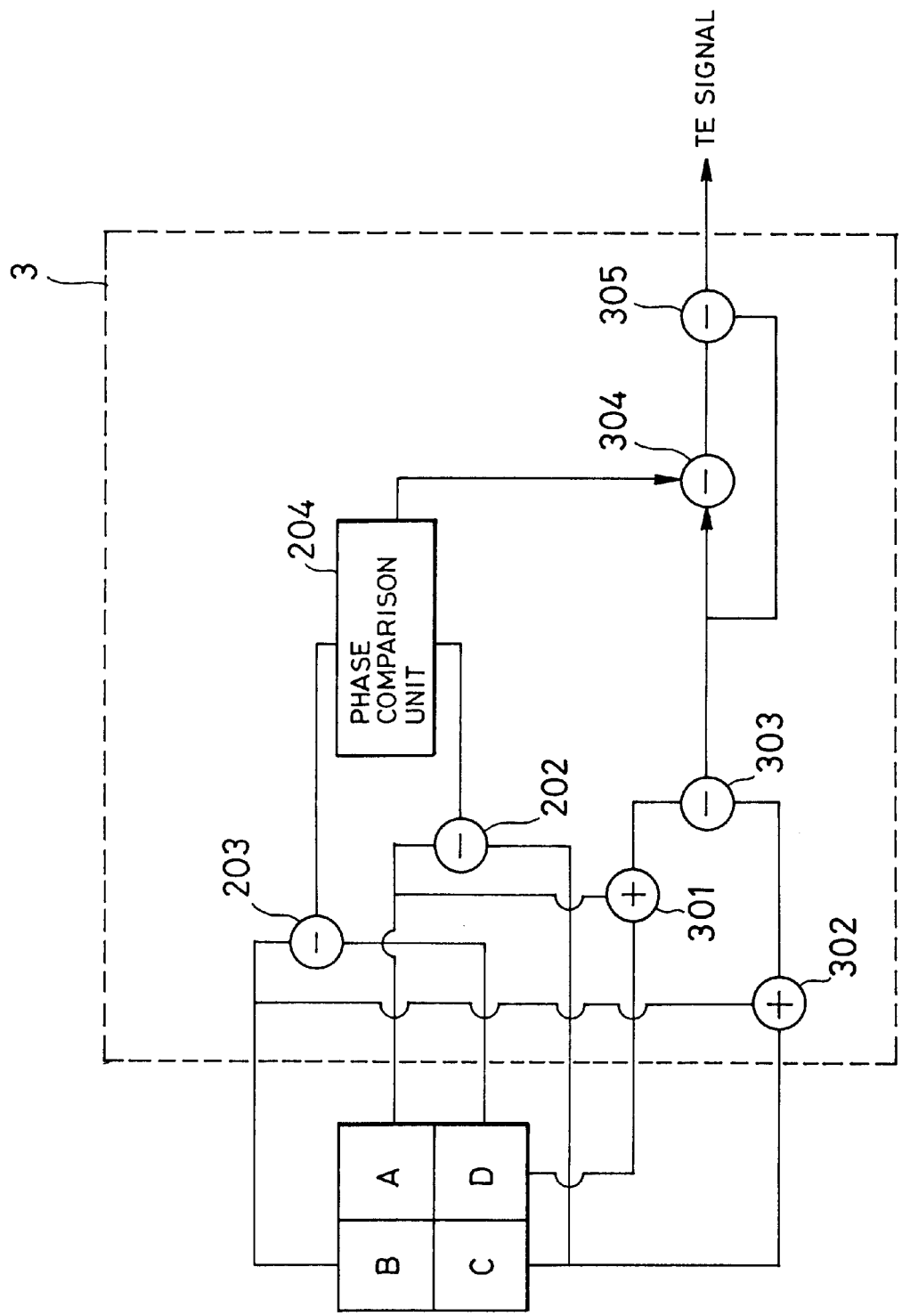
FIG. 6 is a detail view of a tracking error signal generating unit 3 shown in FIG. 5.

In FIG. 6, the tracking error signal generating unit 3 comprises adders 301, 302 and subtractors 303, 304, and 305, along with the subtractors 202, 203 and the phase comparison circuit 204 shown in FIG. 2. The adder 301, or third computing means, obtains the sum of the output signals from the first and fourth divided light receiving sections "A" and "D" ($S_A+S_D$). The adder 302, or fourth computing mean, obtains the sum of the output signals from the second and third divided light receiving sections "B" and "C" ($S_B+S_C$). The subtractor 303, or fifth computing means, obtains a difference between the output signal from the adder 301 and the output signal from the adder 302 to generate a so-called push-pull error signal. The subtractor 304, or sixth computing means, subtracts a phase difference signal $S_{PD}$ obtained by the phase comparison circuit 204 from the push-pull error signal obtained by the subtractor 303. The subtractor 305, or seventh computing means, subtracts the output signal of the subtractor 304 from the push-pull error signal mentioned above. The output from the subtractor 305 is supplied to the drive circuit 5 as the tracking error signal.

In such configuration, the subtractor 304 extracts a lens offset component contained in the push-pull error signal. This lens offset component can therefore be removed from the push-pull error signal in the subtractor 305, whereby a push-pull error signal containing no lens offset component can be obtained.

The second embodiment is effective when the light beam with which the wobbling track is irradiated has a beam diameter sufficiently smaller than the pitch of the wobbling signal along the tangent direction of the track (the distance equivalent to one period of the wobbling signal).

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A tracking control circuit for making a light beam follow a wobbling track formed on an optical recording medium, comprising driving means for driving said light beam across said wobbling track under a tracking error signal generated in accordance with a reflected beam from said optical recording medium, of said light beam incident on said optical recording medium, said tracking control circuit further comprising:

light detector for receiving said reflected beam, said light detector being divided into at least four sections by a first dividing line optically parallel to a tangent direction of said wobbling track and a second dividing line optically parallel to a direction orthogonal to the tangent direction;

first computing circuit for obtaining a difference between the output signals from a first divided light receiving section and a third divided light receiving section located on a first diagonal line on said light detector, to output a first differential signal;

second computing circuit for obtaining a difference between the output signals from a second divided light receiving section and a fourth divided light receiving section located on a second diagonal line on said light detector, to output a second differential signal; and phase comparing circuit for comparing said first differential signal and said second differential signal in phase to output said tracking error signal.

2. A tracking control circuit for making a light beam follow a wobbling track formed on an optical recording medium, comprising driving means for driving said light beam across said wobbling track under a tracking error signal generated in accordance with a reflected beam from said optical recording medium, of said light beam incident on said optical recording medium, said tracking control circuit further comprising:

light detector for receiving said reflected beam, said light detector being divided into at least four sections by a first dividing line optically parallel to a tangent direction of said wobbling track and a second dividing line optically parallel to a direction orthogonal to the tangent direction;

first computing circuit for obtaining a difference between the output signals from a first divided light receiving section and a third divided light receiving section located on a first diagonal line on said light detector, to output a first differential signal;

second computing circuit for obtaining a difference between the output signals from a second divided light receiving section and a fourth divided light receiving section located on a second diagonal line on said light detector, to output a second differential signal;

phase comparing circuit for comparing said first differential signal and said second differential signal in phase to output a phase difference signal;

third computing circuit for obtaining the sum of the output signals from said first divided light receiving section and said fourth divided light receiving section in said light detector to output a first sum signal;

fourth computing circuit for obtaining the sum of the output signals from said second divided light receiving section and said third divided light receiving section in said light detector to output a second sum signal;

fifth computing circuit for obtaining a difference between said first sum signal and said second sum signal to output a third differential signal;

sixth computing circuit for obtaining a difference between said third differential signal and said phase difference signal to output a fourth differential signal; and seventh computing circuit for obtaining a difference between said third differential signal and said fourth differential signal to output a fifth differential signal, wherein said fifth differential signal is used as said tracking error signal.

3. A tracking control circuit according to claim 1, wherein the first and second differential signals are respectively given by:

$$DAC = 4YF \sin(\omega t + \Phi) \qquad (1), \text{ and}$$

$$DBD = 4YF \sin(\omega t - \Phi) \qquad (2)$$

where

Y=respective overlaps between the (0, 0)-th diffraction light beam and the (±1, 1)-th diffraction light beams of said reflected beam light received by the light detector in said first and second diagonal lines, $$F = -(2/\pi^2)\sin(\pi \cdot g/q)\sin(2\pi \cdot wo/q),$$

$\Phi = 2\pi \cdot v/q$,
v=an amount of off-track,
g=groove width,
q=track pitch,
wo=an amount of wobble,
$\omega$=wobbling frequency, and
t=time.

4. A tracking control circuit according to claim 2, wherein the first and second differential signals are respectively given by:

$$DAC = 4YF \sin(\omega t + \Phi) \qquad (1), \text{ and}$$

$$DBD = 4YF \sin(\omega t - \Phi) \qquad (2)$$

where

Y=respective overlaps between the (0, 0)-th diffraction light beam and the (±1, 1)-th diffraction light beams of said reflected beam light received by the light detector in said first and second diagonal lines, $$F = -(2/\pi^2)\sin(\pi \cdot g/q)\sin(2\pi \cdot wo/q),$$

$\Phi = 2\pi \cdot v/q$,
v=an amount of off-track,
g=groove width,
q=track pitch,
wo=an amount of wobble,
$\omega$=wobbling frequency, and
t=time.

* * * * *